United States Patent
Miyoshi

(10) Patent No.: US 8,743,487 B2
(45) Date of Patent: Jun. 3, 2014

(54) LENS BARREL ENABLING LENS INCLINATION ADJUSTMENT AND IMAGING APPARATUS PROVIDED WITH SAME

(71) Applicant: Canon Kabushiki Kaisha, Tokyo (JP)

(72) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/688,466

(22) Filed: Nov. 29, 2012

(65) Prior Publication Data

US 2013/0155530 A1 Jun. 20, 2013

(30) Foreign Application Priority Data

Dec. 16, 2011 (JP) ................. 2011-275212

(51) Int. Cl.
*G02B 7/02* (2006.01)
(52) U.S. Cl.
USPC .......................................... 359/823; 359/824
(58) Field of Classification Search
USPC ................................. 359/823, 827
See application file for complete search history.

(56) References Cited

U.S. PATENT DOCUMENTS

2008/0117527 A1 * 5/2008 Nuno et al. ............. 359/687

FOREIGN PATENT DOCUMENTS

JP 2009-237409 A 10/2009

* cited by examiner

*Primary Examiner* — James Jones
(74) *Attorney, Agent, or Firm* — Fitzpatrick, Cella, Harper & Scinto

(57) ABSTRACT

A lens barrel is configured to adjust a position of an adjusted lens in the direction of an optical axis with respect to another lens. The lens barrel includes a lens frame configured to retain the adjustment lens and a base frame configured to adjustably retain the lens frame. The lens frame includes a first adjustment stepped surface including a plurality of adjustment surfaces that are adjacently disposed in the direction of rotation of the lens frame and are provided with different heights, and a second adjustment stepped surface. The second adjustment stepped surface is disposed at a position exhibiting a 180 degree rotational phase from the position of the first adjustment stepped surface. The base frame includes a support surface configured to abut with the first adjustment stepped surface and the second adjustment stepped surface.

5 Claims, 5 Drawing Sheets

INCLINATION ADJUSTMENT

LENS BARREL ENABLING LENS INCLINATION ADJUSTMENT AND IMAGING APPARATUS PROVIDED WITH SAME

BACKGROUND

1. Technical Field

The present disclosure relates to a lens barrel that enables inclination adjustment of a lens and to an imaging apparatus that is provided with the lens barrel.

2. Description of the Related Art

In recent years, the progressive increases to magnification performance and downsizing have been made to an imaging apparatus such as a camera or a video camera.

Proposals include eccentricity adjustment to align the lens axis, inclination adjustment to adjust inclination of the lens axis, and tracking adjustment to adjust the lens interval (interval in the optical axis direction) of adjacent lenses.

Japanese Patent Application Laid-Open No. 2009-237409 discloses a method of adjusting the movement of a lens by adjusting the height with reference to the optical axis direction.

A though hole is provided in a lens frame disclosed in Japanese Patent Application Laid-Open No. 2009-237409 for insertion of a screw into the outer peripheral side of the lens. The lens frame is rotated with reference to an adjustment position for the lens and the lens frame is fixed by provision of a screw fastening at three positions at the adjustment position.

However, a conventional lens barrel requires a large space for fixing the lens frame to the outer peripheral portion of the lens.

SUMMARY

The lens barrel according to this embodiment enables positional adjustment of the lens frame with a simple structure and thereby enables a reduction in the space required for positional adjustment.

According to an aspect of the present disclosure, a lens barrel is configured to adjust a position of an adjusted lens in the direction of an optical axis with respect to another lens. The lens barrel includes a first retaining frame configured to retain the adjustment lens, and a second retaining frame configured to adjustably retain the first retaining frame. One of the first and the second retaining frames has a first adjustment surface group including a plurality of adjustment surfaces that are adjacently disposed in the direction of rotation about the optical axis of the adjustment lens and are provided with different heights, and a second adjustment surface group having a different configuration from the first adjustment surface group, having a plurality of adjustment surfaces that are adjacently disposed in the direction of rotation of the adjustment lens and are provided with different heights, and disposed at a position exhibiting a 180 degree rotational phase from the position of the first adjustment surface group. The retaining frame of either the first or second retaining group that is not provided with the first and the second adjustment surface groups has a supporting portion configured to abut with the first adjustment surface group or the second adjustment surface group.

Further features of the present disclosure will become apparent from the following description of exemplary embodiments with reference to the attached drawings.

DESCRIPTION OF THE EMBODIMENTS

Figure 1:
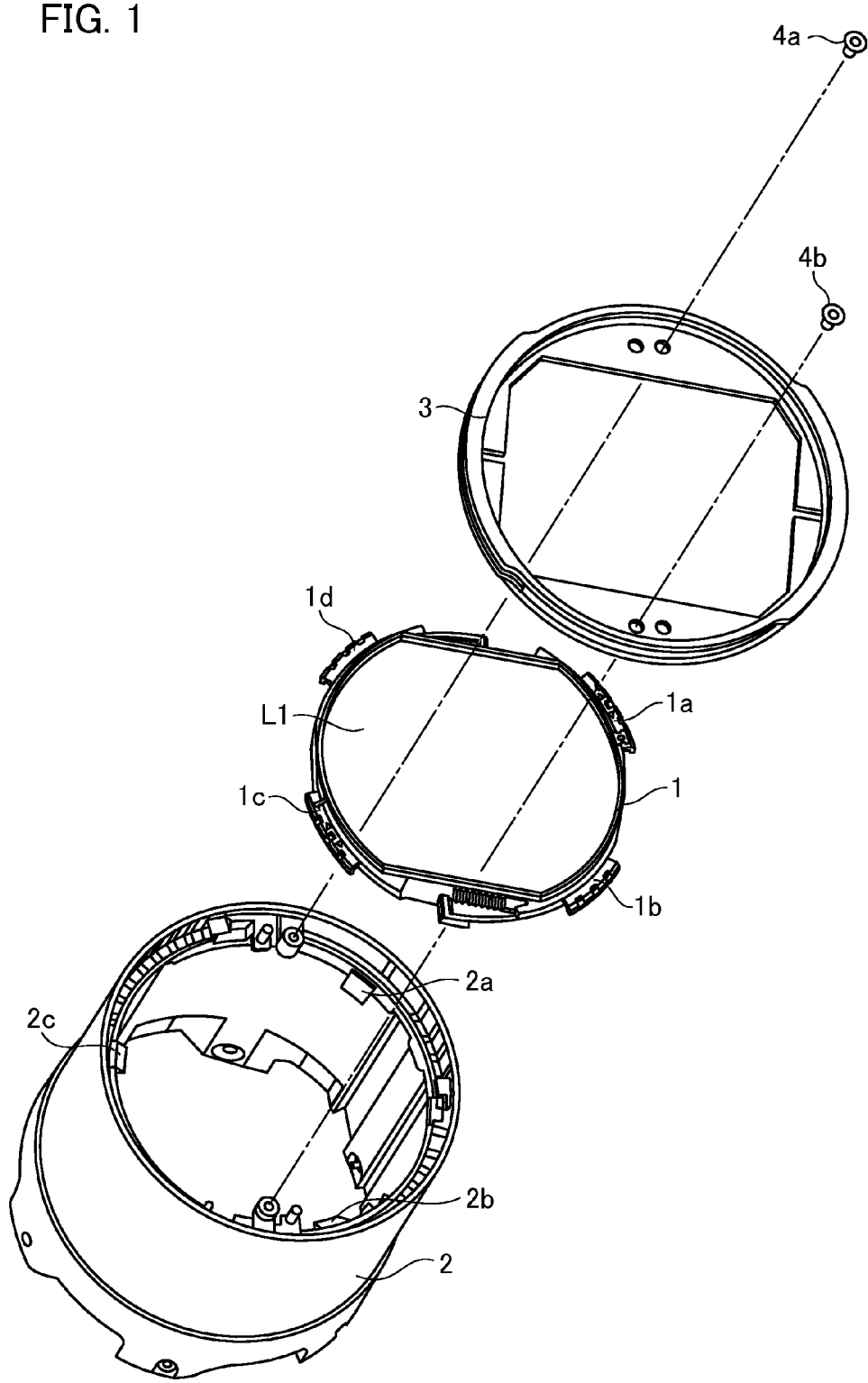
FIG. 1 illustrates an example of a partial perspective view of a lens barrel according to the present exemplary embodiment.
Figure 2A:
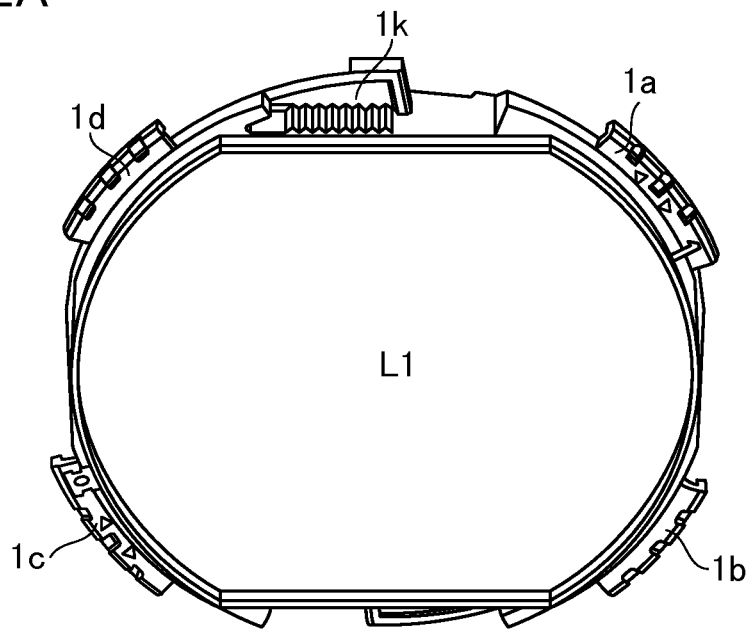
FIGS. 2A and 2B illustrate an example of a lens frame configured to support an adjusted lens.
Figure 2B:
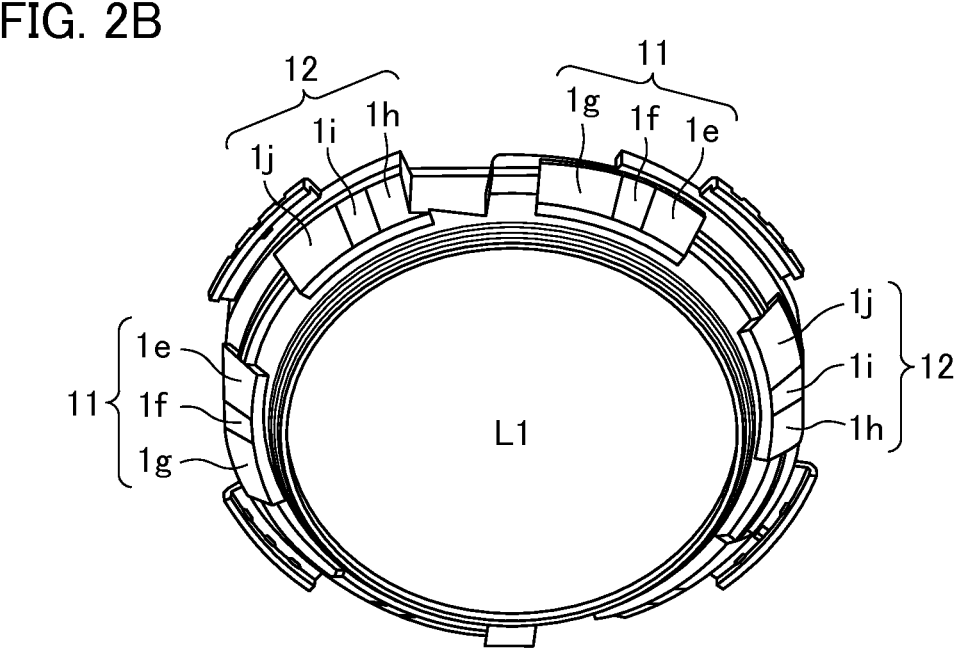

A lens barrel according to the preferred embodiment will be described below making reference to FIG. 1 to FIG. 5. FIG. 1 illustrates an example of a partial perspective view of a lens barrel according to the present exemplary embodiment. FIG. 2A and FIG. 2B illustrate an example of a lens frame configured to support an adjusted lens. FIG. 3 illustrates the relationship between the adjusted lens and a base frame and illustrates an example of a sectional view of a base frame and a lens frame. The imaging apparatus according to the present exemplary embodiment includes the lens barrel according to the present exemplary embodiment that is described below.

The lens barrel according to the present exemplary embodiment displaces a lens that is to be adjusted in the direction of the optical axis with respect to another lens group (not illustrated) that configures the lens barrel, or inclines the optical axis of the lens to be adjusted with respect to a reference axis to thereby perform an adjustment to a position that satisfies the optical performance. In other words, the lens barrel includes a positional adjustment structure that enables adjustment of the position of the direction of the optical axis of the lens to be adjusted included in a plurality of lenses in an optical system relative to another lens. In the following description, adjustment by moving towards the direction of the optical axis (adjustment of the interval in the optical axis direction of adjacent lenses) is termed tracking adjustment, and adjustment by inclining the optical axis of the adjusted lens relative to a reference axis is termed inclination adjustment.

Figure 3A:
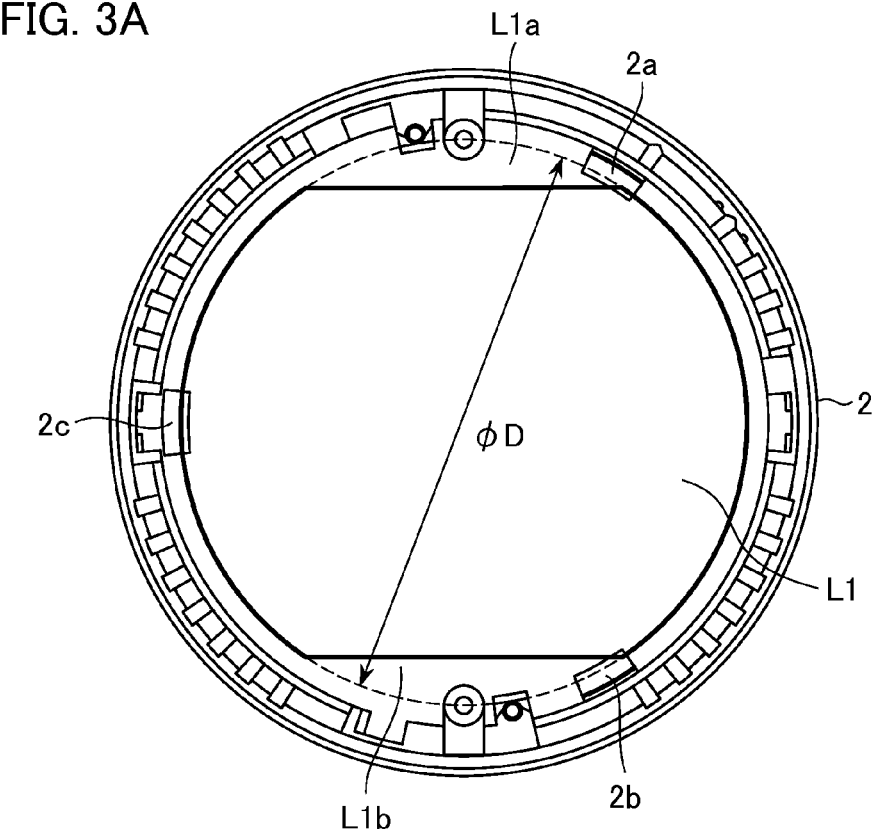
FIG. 3A illustrates the relationship between the adjusted lens and a base frame.

FIG. 3A illustrates the relationship between the adjusted lens and the base frame. The adjusted lens L1 undergoes positional adjustment. As illustrated in FIG. 3A, the adjusted lens L1 is configured with a shape in which the portions L1a, L1b on two sides in the vertical direction are cut from a circular shape φD. The lens frame 1 retains the adjusted lens L1 (first retaining frame).

As illustrated in FIG. 2A, the lens frame 1 includes four fixed arm portions 1a, 1b, 1c, 1d that are fixing members that extend in a diameter direction, and that have a symmetrical configuration when rotated through 180 degrees. The fixed arm portions are arms configured to fix by coating an adhesive agent onto the fixed arm portions 1a, 1b, 1c, 1d at the adjustment position of the adjusted lens.

As illustrated in FIG. 2B, a first adjustment stepped surface 11 and a second adjustment stepped surface 12 are provided on an outer peripheral surface of the portion (supporting portion) at which the adjusted lens L1 is supported in a configuration in which the lens frame 1 retains the adjusted lens L1. The first adjustment stepped surface 11 functions as a first adjustment surface group that includes a plurality of adjustment surfaces that are adjacently disposed in the direction of rotation of the lens frame 1 and are provided with different heights. In the present example, the first adjustment stepped surface 11 includes three adjustment surfaces 1e, 1f, 1g. The respective adjustment surfaces of the first adjustment stepped surface 11 are arranged with different heights with reference to a tracking adjustment width.

The second adjustment stepped surface 21 functions as a second adjustment surface group that includes a plurality of adjustment surfaces that are adjacently disposed in the direction of rotation of the lens frame 1 and are provided with different heights. In the present example, the second adjustment stepped surface 12 includes three adjustment surfaces 1h, 1i, 1j. The respective adjustment surfaces of the second adjustment stepped surface 12 are arranged with different heights with reference to a tracking adjustment width that is different from the tracking adjustment width of the first adjustment stepped surface 11. The second adjustment stepped surface 12 is disposed at a position exhibiting a 180 degree rotational phase from the position of the first adjustment stepped surface 11.

The base frame 2 retains the lens frame 1 in an adjustable configuration (second retaining frame). The lens frame 2 is connected with a lens group (not illustrated) other than the adjusted lens L1 and therefore the lens barrel according to the present exemplary embodiment is configured as a lens barrel that is formed from a plurality of lens groups.

A supporting surfaces 2a, 2b, 2c are provided at a 120 degree interval on the inner peripheral portion of the base frame 2. The supporting surfaces 2a to 2c support the lens frame 1 by abutting with the first adjustment stepped surface 11 and the second adjustment stepped surface 12 of the lens frame 1.

In the present exemplary embodiment, although the lens frame 1, that is to say, the first retaining frame includes the first adjustment stepped surface and the second adjustment stepped surface, rather than the lens frame 1, the base frame 2, that is to say, the second retaining frame may be configured to include the first adjustment stepped surface and the second adjustment stepped surface. That is to say, either one of the first and the second retaining frames includes the first adjustment surface group and the second adjustment surface group.

The supporting surfaces 2a to 2c that include the base member as illustrated in FIG. 3A function as a supporting portion configured to abut with the first adjustment stepped surface or the second adjustment stepped surface provided in the lens frame 1. At least one of the supporting surfaces 2a to 2c (in the present example, the supporting surfaces 2a and 2b) is provided at a position that overlaps in the optical axis direction with the lens cut portions L1a, L1b of the adjusted lens L1. In this manner, the supporting surfaces 2a, 2b, 2c may not be provided on the outer side than the outer diameter φD of the adjusted lens L1, and therefore an increase in the size of the lens barrel can be prevented.

A cover member 3 includes an opening in a central portion that is configured to allow the light flux to enter on the imaging element through the lens barrel. The cover member 3 is provided on the imaged-object side of the lens frame 1. The cover member 4 is fixed to the base frame 2 by a screw 4.

Figure 3B:
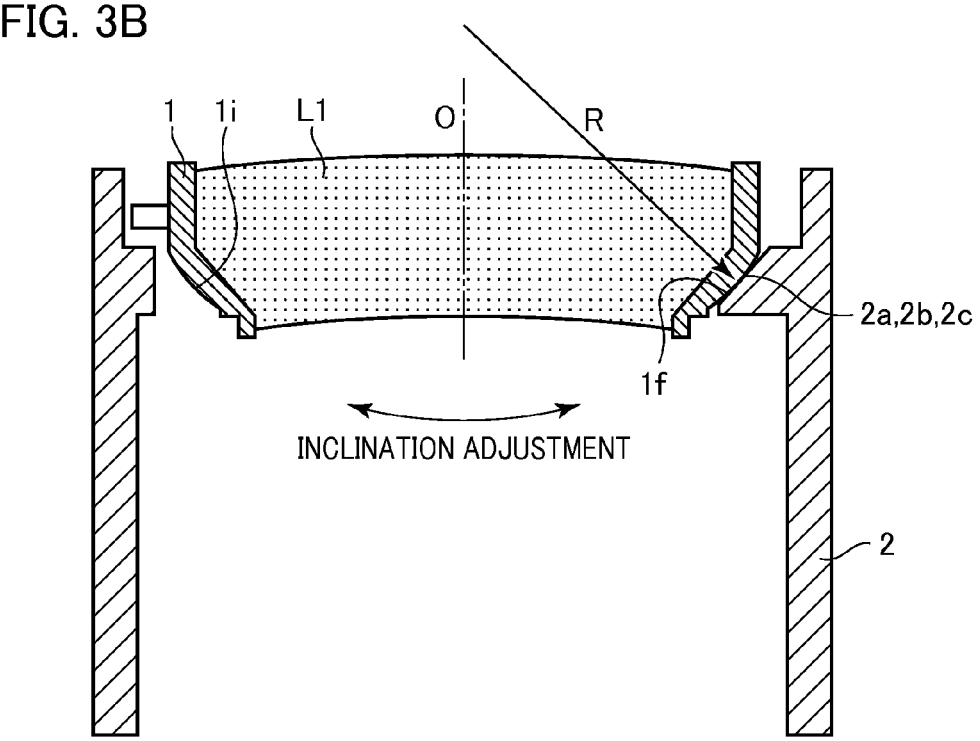
FIG. 3B illustrates an example of a sectional view of a base frame and a lens frame.

FIG. 3B illustrates an example of a sectional view of a base frame and a lens frame. Making reference to FIG. 3B, the abutment of the first adjustment stepped surface 11 or the second adjustment stepped surface 12 of the lens frame 1 with the supporting surfaces 2a to 2c of the base frame will be described. In the following description, although a configuration in which the first adjustment surface 1f abuts with the supporting surface 2a will be described, the supporting surface also abuts with another adjustment surface in the same configuration.

The position of abutment with the supporting surfaces 2a, 2b, 2c of the base frame 2 is changed in a sequential configuration by rotating through the width of the three adjustment surfaces 1e, 1f, 1g that are provided on the first adjustment stepped surface 11. In this manner, the height with respect to the direction of the optical axis of the adjusted lens L1 can be changed, and thereby tracking adjustment can be performed.

The adjustment surfaces 1e, 1f, 1g are prepared in an R-plane shape from a predetermined reference position. Therefore, when the adjustment surface abuts with the supporting surfaces 2a, 2b, 2c of the base frame 2 that is configured from a flat inclining surface, the optical axis O on the R plane can be inclined about the predetermined reference position. In this manner, an inclination adjustment is enabled. Although the supporting surface is provided at three positions at a 120 degree interval in order to provide stable support for the lens frame 1, there is no requirement for equal 120 degree intervals.

In the present example, although the base frame 2 includes a supporting surface, the base frame 2 may include the first adjustment stepped surface and the second adjustment stepped surface, and the lens frame 1 may include the supporting surfaces. That is to say, of the first and the second retaining frames, a retaining frame that is different from the retaining frame provided with the first adjustment stepped surface and the second adjustment stepped surface is provided with a supporting portion that abuts with the first adjustment stepped surface or the second adjustment stepped surface.

Figure 4A:
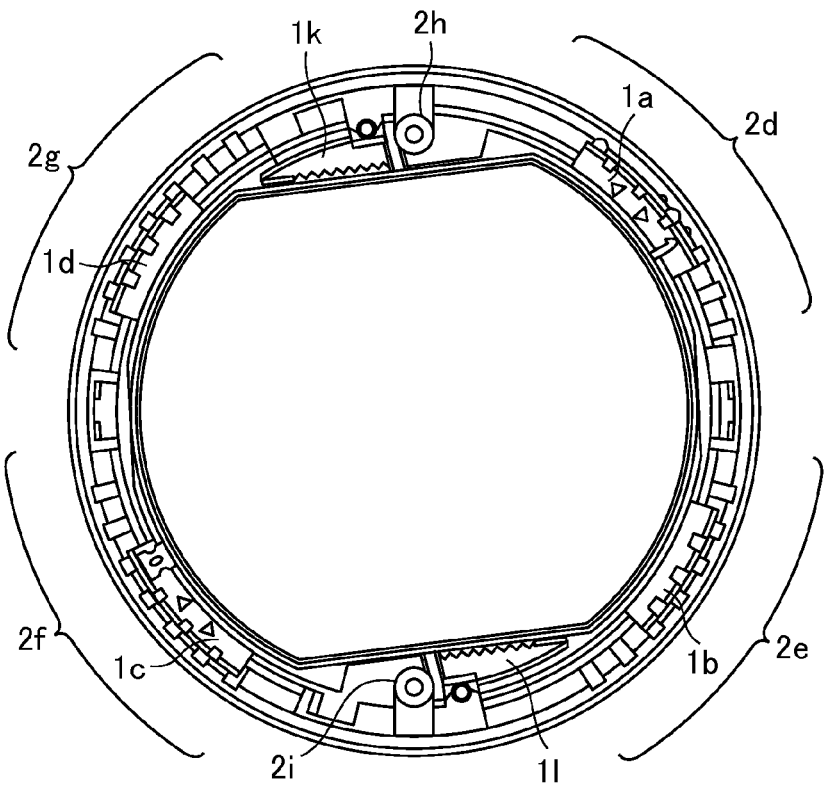
FIG. 4A and FIG. 4B illustrate the change in the abutment configuration of the supporting surface and the adjustment surface when performing tracking adjustment.
Figure 4B:
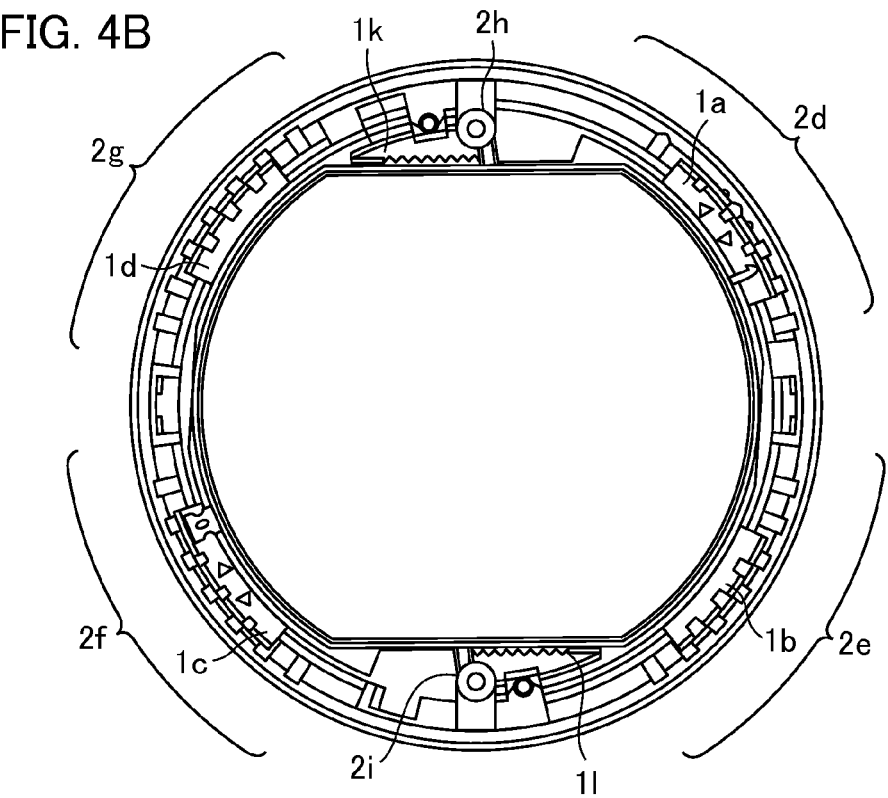
Figure 5:
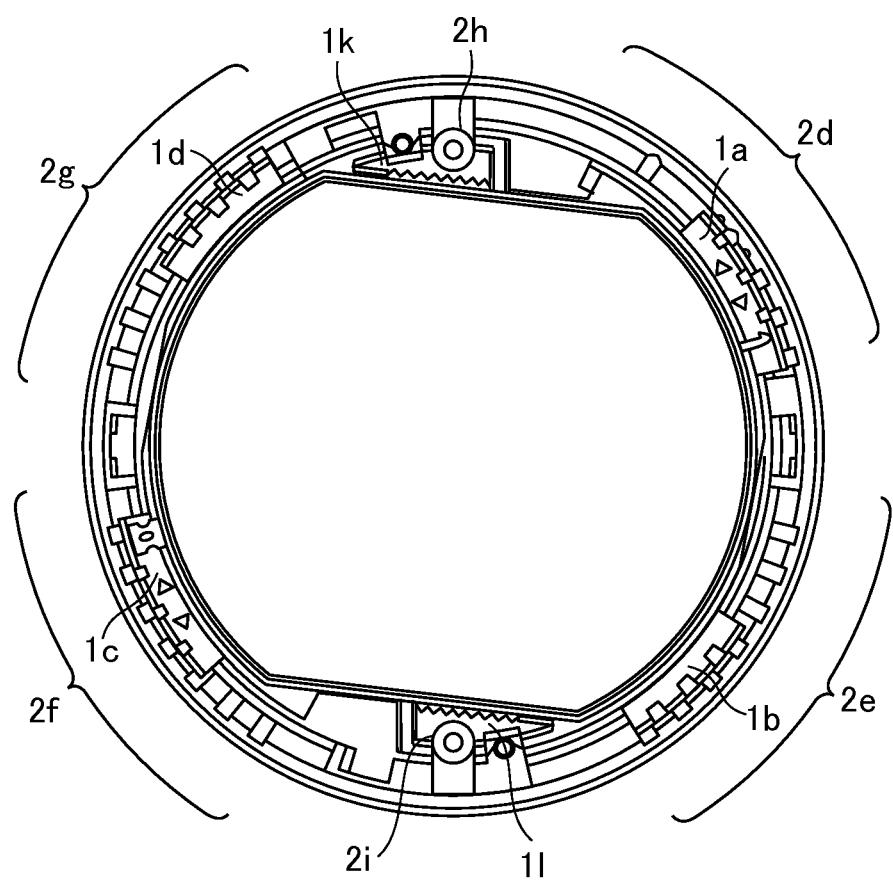
FIG. 5 illustrates the change in the abutment configuration of the supporting surface and the adjustment surface when performing tracking adjustment.

FIG. 4A, FIG. 4B and FIG. 5 illustrate a change in the abutment state of the adjustment surface and the supporting surface during tracking adjustment. FIG. 4A illustrates the state of the abutment configuration of the supporting surfaces 2a, 2b, 2c and the adjustment surface 1e. FIG. 4B illustrates the abutment configuration of the supporting surfaces 2a, 2b, 2c and the adjustment surface 1f. FIG. 5 illustrates the abutment configuration of the supporting surfaces 2a, 2b, 2c and the adjustment surface 1e.

The lens frame 1 after inclination adjustment and tracking adjustment is fixed by adhesion to the base frame 2. When disposed to enable coating with an adhesive agent within the range of 2d, 2e, 2f, 2g as illustrated in FIG. 4A, FIG. 4B and FIG. 5, coating of the adhesive agent onto the fixed arm portions 1a, 1b, 1c, 1d can be ensured in relation to any of the configurations illustrated in FIG. 4A, FIG. 4B and FIG. 5. In this manner, fixation of the lens frame 1 to the base frame 2 can be ensured.

The coating range 2d, 2e, 2f of the adhesive agent is determined based on the width of the fixed arm portions, and the rotation amount of the lens frame 1 that is used for tracking adjustment. That is to say, the lens frame 1 and the base frame 2 are fixed by the fixed arm portion that is coated with the adhesive agent. In the present exemplary embodiment, the portion that corresponds to the L1a, L1b portion that is cut from the curve of the adjust lens L1 is used for provision of an adhesive grooves 1k, 1l in the lens frame 1, and bonding and fixing with the base frame 2 is performed.

The coating range of the adhesive agent relative to the fixed arm portion is a range that is determined based on the width in the rotation direction of the fixed arm portion and the rotation amount required for tracking adjustment of the lens frame 1. A small rotation amount of the lens frame 1 for tracking adjustment enables a corresponding reduction in the coating range of the adhesive agent.

The second adjustment stepped surface 12 may be provided in the lens frame 1, and the second adjustment stepped surface 12 and the supporting surfaces 2a, 2b, 2c can be configured to abut. The second adjustment stepped surface 12 is provided at a 180 degree rotational phase position in relation to the first adjustment stepped surface as described above. That is to say, when the lens frame 1 is rotated through 180 degrees from a state in which the first adjustment stepped surface 11 is in abutment with the supporting surface, and positioned on the base frame 2, the second adjustment stepped surface 12 abuts with the supporting surface.

In other words, the supporting surface that includes a retaining frame that is different from the retaining frame provided with the first adjustment stepped surface and the second adjustment stepped surface abuts with the second adjustment stepped surface in the following configurations. That is to say, the supporting surface abuts with the second adjustment stepped surface when the retaining frame that includes the first adjustment stepped surface and the second adjustment stepped surface moves from a position at which the supporting surface abuts with the first adjustment stepped surface and is positioned on the retaining frame that includes the supporting surface at a 180 degree rotation phase position.

The second adjustment stepped surface 12 is configured with a different height from the first adjustment stepped surface 11, and therefore tracking adjustment is possible at a height position that cannot be adjusted when using the height of the first adjustment stepped surface.

The fixed arm portions 1a, 1b, 1c, 1d of the lens frame 1 are configured to exhibit 180 degree rotational symmetry. More specifically, the fixed arm portion 1a and the fixed arm portion 1c are provided at a 180 degree rotation phase position. Furthermore, the fixed arm portion 1b and the fixed arm portion 1d are provided at a 180 degree rotation phase position. Therefore, even when tracking adjustment is performed using the second adjustment stepped surface 12, when the adhesive coating range for fixing the lens frame 1 is disposed on 2d, 2e, 2f, 2g as illustrated in FIG. 4A, FIG. 4B and FIG. 5, fixation of the lens frame 1 to the base frame 2 can be ensured.

In a configuration in which an adjustment surface is provided on the base frame 2 and not the lens frame 1, and the supporting surface is provided in the lens frame 1, the base frame 2 may include the fixed arm portions. That is to say, of the first and second retaining frames, a plurality of fixed arm portions is provided to fix the retaining frame with respect to the retaining frame provided with the supporting surface to the outer peripheral portion of the retaining frame that includes the first adjustment stepped surface and the second adjustment stepped surface. The respective fixed arm portions that include the plurality of fixed arm portions are provided at a 180 degree rotation phase position relative to the corresponding fixed arm portion.

According to the above configuration, in addition to enabling adjustment on the first adjustment stepped surface by rotation of the lens frame 1, adjustment is also possible on the second adjustment stepped surface by rotating the lens frame 1 through 180 degrees with respect to the base frame 2. That is to say, a positional adjustment mechanism is provided that enables adjustment with the two adjustment steps of the first adjustment stepped surface and the second adjustment stepped surface merely by use of a rotation angle of the lens frame corresponding to the number of steps provided on the first adjustment stepped surface.

More specifically, height adjustment with the three steps on the first adjustment stepped surface 11 is enabled, and height adjustment with the three steps of a different height on the second adjustment stepped surface 12 is possible. That is to say, according to the lens barrel in the present exemplary embodiment, the rotation angle of the lens frame 1 that is rotated for adjustment can be maintained at a small value, and height adjustment with six steps is possible.

The requirement for only a small rotation angle with respect to the lens frame 1 enables a reduction in the rotation range of the fixed arm portion 1a, 1b, 1c, 1d in order to fix the lens frame 1. As a result, the range 2d, 2e, 2f, 2g for the coating of an adhesive agent can be reduced. With this configuration of a small adhesive coating range, a space on the outer peripheral portion of the adjusted lens L1 can be used for configuration elements other than adhesion.

In the present exemplary embodiment, a screw fixing seat 2h, 2i for fixing of the cover component 4 is provided in a space on the outer peripheral portion of the adjusted lens L1. The space on the outer peripheral portion is available for use as a space for example for insertion of a portion of the constituent components disposed closer to the imaging elements than the lens frame 1, or constituent elements such as a barrier component to protect the lens from damage when the lens barrel is mounted. In this manner, the efficiency of the lens barrel can be enhanced.

According to the present exemplary embodiment as described above, a configuration is possible in which positional adjustment is possible by rotation of the lens frame 1 and the positional adjustment is possible by rotation of the lens frame through a number of steps that is half of the number of steps that are available for adjustment. In this manner, the lens barrel can be downsized.

That is to say, the lens barrel according to the present disclosure enables positional adjustment of the lens frame with a simple structure and reduction of the required space for positional adjustment. Therefore, the outer peripheral space of the lens frame can be effectively used for other constituent elements.

There is no limitation to the embodiments described above, and various changes and modifications are possible within the spirit of the invention. For example, the number of the adjustment surfaces of the first adjustment stepped surface 11 and the second adjustment stepped surface 12 may be different, or any of the first adjustment stepped surfaces 11 or any of the second adjustment stepped surfaces 12 may be of the same height.

In the examples described above, the adjusted lens L1 has a configuration that enables tracking adjustment and inclination adjustment, and the first adjustment stepped surface has an R surface shape. However, a configuration for only a tracking adjustment may be provided. The first adjustment stepped surface may also be configured as a flat surface.

In the example above, although the φD curved portions L1a, L1b of the adjusted lens L1 have a cut lens shape, there is no limitation in this regard, and the shape may be circular, or a shape configured by cutting in a transverse direction.

Aspects of the present disclosure can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present disclosure has been described with reference to exemplary embodiments, it is to be understood that the claimed invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275212 filed Dec. 16, 2011, which is hereby incorporated by reference herein in its entirety.

What is claimed is:

1. A lens barrel that is configured to adjust a position of an adjusted lens in the direction of an optical axis with respect to another lens, the lens barrel comprising:
 a first retaining frame configured to retain the adjustment lens; and
 a second retaining frame configured to adjustably retain the first retaining frame,
 wherein one of the first and the second retaining frames comprises a first adjustment surface group including a plurality of adjustment surfaces that are adjacently disposed in the direction of rotation about the optical axis of the adjustment lens and are provided with different heights, and a second adjustment surface group having a different configuration from the first adjustment surface group, having a plurality of adjustment surfaces that are adjacently disposed in the direction of rotation of the adjustment lens and are provided with different heights, and disposed at a position exhibiting a 180 degree rotational phase from the position of the first adjustment surface group, and
 wherein the retaining frame of either the first or second retaining group that is not provided with the first and the second adjustment surface groups comprises a supporting portion configured to abut with the first adjustment surface group or the second adjustment surface group.

2. The lens barrel according to claim 1, wherein, when the supporting portion is positioned on the retaining frame, the supporting portion abuts with the second adjustment surface group at a 180 degree rotation phase position from which the supporting portion abuts with the first adjustment stepped surface.

3. The lens barrel according to claim 1, wherein of the first and second retaining frames, a plurality of fixed members are configured to fix the retaining frame with respect to the retaining frame provided with the supporting portion to the outer peripheral portion of the retaining frame that includes the first and second adjustment surface groups, and wherein the respective fixed members are positioned at 180 degree phase positions relative to corresponding fixed members.

4. The lens barrel according to claim 1, wherein the first retaining frame and the second retaining frame are fixed by the fixed member coated with adhesive, and
 wherein the range of coating of the adhesive for the fixed member is determined based on the width of the rotation direction of the fixed member and the rotation amount required for positional adjustment of the retaining frame including the fixed member.

5. An imaging apparatus comprising the lens barrel according to claim 1.

* * * * *